United States Patent [19]

Mills

[11] Patent Number: 5,620,223
[45] Date of Patent: Apr. 15, 1997

[54] GRIPPING DEVICE

[75] Inventor: Douglas W. Mills, Freeport, Ill.

[73] Assignee: Gabco Air, Inc., Gainesville, Fla.

[21] Appl. No.: 520,024

[22] Filed: Aug. 28, 1995

[51] Int. Cl.$^6$ ............................................. B25J 15/08
[52] U.S. Cl. ........................... 294/88; 294/93; 294/119.1;
901/37
[58] Field of Search ......................... 294/88, 93, 119.1;
269/25; 414/729, 730, 741, 751; 901/31,
32, 37, 39

[56] References Cited

U.S. PATENT DOCUMENTS

| | | | |
|---|---|---|---|
| 4,509,783 | 4/1985 | Ionescu | 294/88 |
| 4,591,199 | 5/1986 | Zajac | 294/88 |
| 4,593,948 | 6/1986 | Borcea et al. | 294/88 |
| 4,611,846 | 9/1986 | Feiber et al. | 294/119.1 X |
| 4,865,375 | 9/1989 | Laub et al. | 294/119.1 X |
| 5,163,729 | 11/1992 | Borcea et al. | 294/119.1 |
| 5,529,359 | 6/1996 | Borcea et al. | 294/119.1 X |

Primary Examiner—Johnny D. Cherry
Attorney, Agent, or Firm—Edward M. Livingston, Esq.

[57] ABSTRACT

A device for gripping objects having a body with opposing sides, each side having a plurality of inwardly directed cylinders aligned with cylinders from the opposing side to receive a plurality of pistons extending between the aligned cylinders. The cylinders define a space located axially off the ends of the pistons. Internal fluid passages within the gripping device interconnect the spaces off the ends of the pistons to a first and second port which are disposed for connection to an external fluid pressure source. The fluid passages in communication with the first and second ports are connected to the ends of each piston in such a manner that applying a relatively high fluid pressure to the first port and a relatively low fluid pressure to the second port will cause the pistons to move axially in the direction from the space in communication with the first port toward the space in communication with the second port. The spaces off the ends of the pistons are interconnected with the first and second passages so that one-half of the plurality of pistons move in one direction while the remaining half of the pistons move in the opposite direction. A pair of opposing gripping jaws are carried on the pistons so that movement of the pistons imparts an equal movement to the gripping jaws.

14 Claims, 7 Drawing Sheets

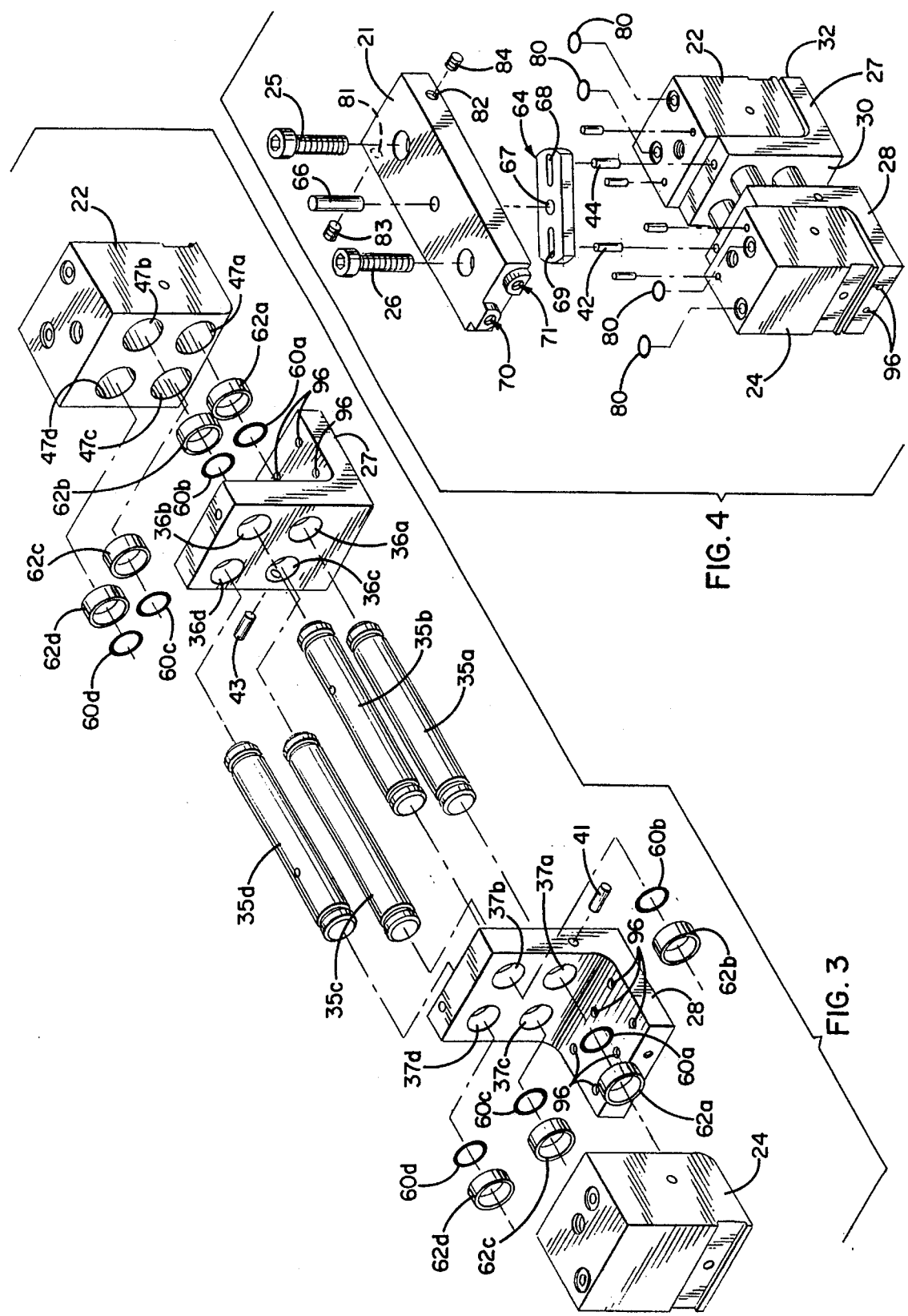

GRIPPING DEVICE

FIELD OF THE ART

The present invention relates generally to gripping devices and, more particularly, to a gripping device having linearly reciprocating gripping jaws that are operated in response to the controlled application of fluid pressure.

BACKGROUND OF THE INVENTION

Gripping devices are well known and widely used in a variety of applications. For example, industrial applications such as component assembly, packaging, and shipping to name a few. In recent years, robotic applications and other automated processes have proliferated to virtually all aspects of the manufacturing and production. Even in the sales environment, automated machinery is fast replacing human labor to store and retrieve inventory products stocked in warehouses. In the foregoing and other similar applications, various gripping devices are used for handling parts and products.

As will be discussed further below, the present invention is generally directed to gripping devices of the type having a pair of opposing gripping jaws that operate by moving the jaws in an opposing fashion to grip an article. Although a tremendous variety of these types of devices are known, the prior art devices can be generally characterized by opposing gripping jaws operated in a linear fashion by some-type of driving mechanism. This driving mechanism is often in the form of a piston, or pistons, that is driven to reciprocate in a cylinder, wherein the pistons are attached to the gripping jaws so that reciprocation of the pistons serves to reciprocate the gripping jaws. Controlling the reciprocation of the pistons,-in turn, controls the operation of the jaws. Furthermore, reciprocation of the pistons is often controlled by applying fluid pressure to the pistons.

All of the piston-driven prior art, of which applicant is aware, includes what is known as "double acting" pistons. Such double acting pistons operate by applying both the driving and return forces to the same end of the piston. As a result, the driving and return forces are unbalanced. That is, the jaws are usually driven with a greater force in the driving (gripping) direction and lesser force in the return direction. This driving/return force imbalance is known to occur as a result of asymmetric fluid chamber configurations (i.e., the driving chamber and the return chamber).

In uni-directional applications (i.e., applications where the gripping jaws are operative in only one direction), the driving force imbalance is not a problem. However, in bi-directional applications, wherein both inside and outside gripping surfaces are provided on the gripping devices (allowing the gripping device to grip some articles by driving the jaws together to grip the outside of the article or, alternatively, driving the jaws apart to grip the article by an inside edge), unbalanced piston driving forces may be problematic.

Much of the prior art is also characterized by what is known as a "slide and gib" configuration. In this configuration, a mechanical linkage is attached between the driving piston and the gripping jaws, laterally displacing the gripping jaws from the driving piston. As a result, a bending moment is introduced into the structure. It is appreciated that the bending moment increases with increasing length of the mechanical linkage.

SUMMARY OF THE INVENTION

Accordingly, it is a primary aim of the present invention to provide a gripping device having "double acting" pistons that drive a pair of opposed gripping jaws with equal force in alternating directions.

Another object of the present invention is to provide a gripping device having a minimal bending moment introduced in the gripping jaws.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, the present invention is generally directed to a gripping device having a body portion with opposing sides, wherein each side includes at least two inwardly directed cylinders which are aligned with the cylinders of the opposing side. First and second pistons are disposed to extend between the aligned cylinders, and the cylinders are shaped to define a space located axially off the ends of the pistons. Means are included for providing a high fluid pressure to the space off one end of each piston and a relatively low fluid pressure to the space off the other end of each piston. In this way, the high fluid pressure urges each piston axially in the direction of the space having lower fluid pressure. The means are further configured to pressurize the spaces at the ends of the first and second pistons in opposing relation. In this way, the pistons move in opposing directions. First and second gripping jaws are further included and are carried on the pistons. More specifically, the first gripping jaw is carried on the first piston and the second gripping jaw is carried on the second piston, whereby axial movement of the first and second pistons in opposing directions causes the first and second gripping jaws to move in opposing directions. This opposing movement is utilized to clamp and release objects.

In accordance with another aspect of the present invention, the body portion of the gripping device includes first and second fluid passages, which are in further fluid communication with first and second ports. These first and second ports are disposed for connection to an external fluid pressure source that may be configured to controllably pressurize fluid directed to the first and second ports, and thus the first and second fluid passages. Controlled and opposing movement of the pistons is achieved by the structure of the first and second fluid passages, wherein the first fluid passage is in fluid communication with the spaces defined at the first end of the first piston and the second end of the second piston. Likewise, a second fluid communication passage is in fluid communication with the spaces off the second end of the first piston and the first end of the second piston. It can be appreciated that, in accordance with the fluid passage structure, movement of the gripping jaws in opposing relation can be achieved by alternately applying high and low pressure fluid to the first and second fluid ports.

In a preferred embodiment of the present invention, means are provided for insuring symmetric and dependent movement of the gripping jaws. In one embodiment, this means is achieved by way of a rocker arm having a centrally disposed pivot point, and further having elongated guide slots that receive guide pins, which are carried on the gripping jaws. The rocker arm is diagonally disposed between the two gripping jaws, so that movement of either gripping jaw pivots the rocker arm about the central guide pin, which imparts an equal but opposing motion to the other gripping jaw.

While it is appreciated that the broad concepts and teachings of the present invention may be achieved in a two-piston design, it is preferred to use four pistons to drive the gripping jaws. In this embodiment, the internal fluid passages and spaces disposed at the ends of the pistons are interconnected so that the first and third pistons move in concert, while the second and fourth pistons move in concert, Moreover, the concerted movement of the first and third pistons is substantially 180° out of phase with the concerted movement of the second and fourth pistons. It will further be appreciated that the concepts and teachings of the present invention may be implemented in embodiments having more than four pistons.

BRIEF DESCRIPTION OF THE DRAWINGS

The accompanying drawings incorporated in and forming a part of the specification, illustrate several aspects of the present invention, and together with the description serve to explain the principals of the invention. In the drawings:

FIGS. 3 and 4 are exploded perspective views that together illustrate the component parts of the gripping device shown in FIG. 2;

DETAILED DESCRIPTION OF THE PREFERRED EMBODIMENTS

Figure 1:
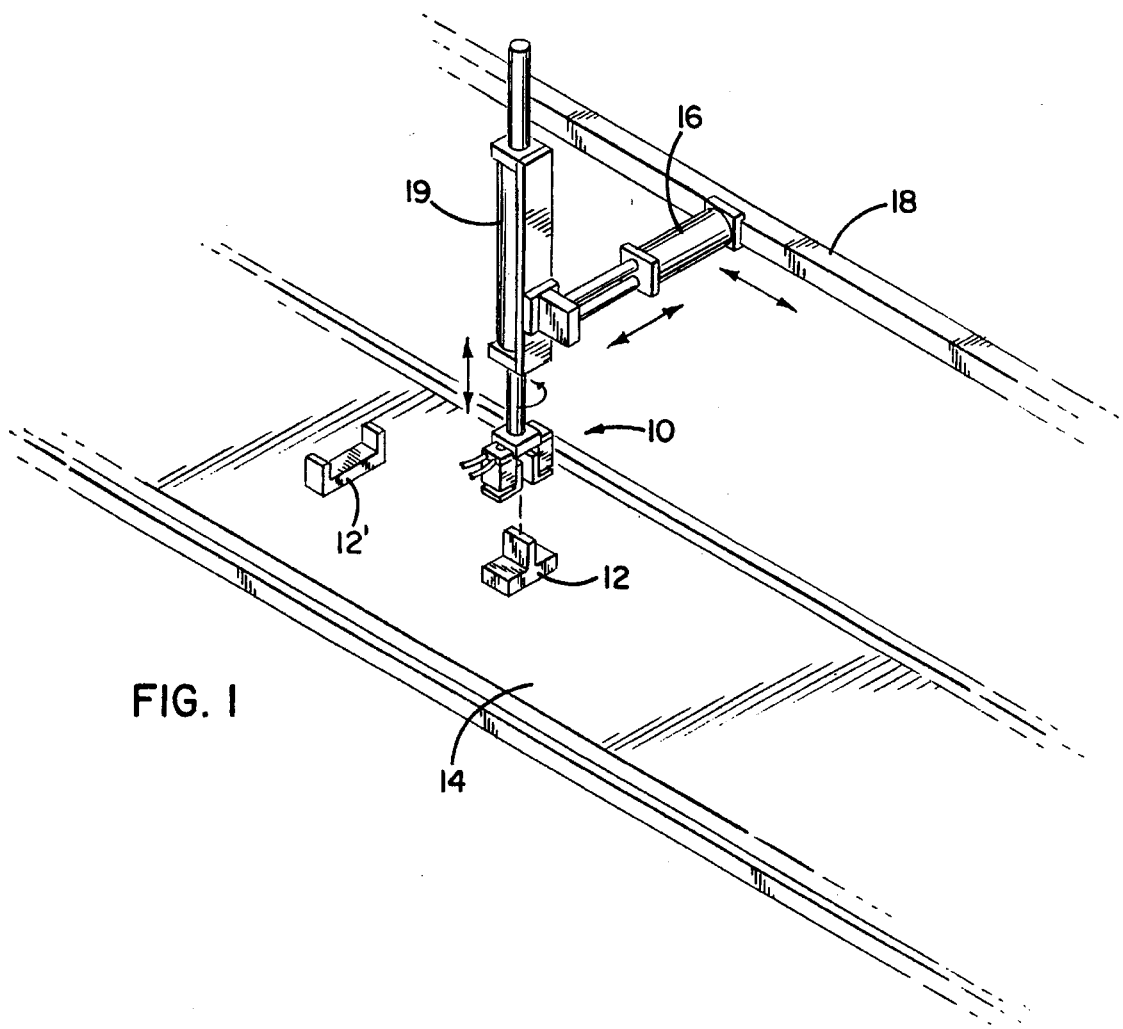
FIG. 1 is a perspective view of the preferred gripping device in a typical operating environment.

Referring now to the drawings, FIG. 1 shows a gripping device in accordance with the present invention, in a typical industrial environment. In this figure, the gripping device, generally designated by reference numeral 10 is shown to grip and lift objects 12 and 12' from a conveyor 14. A horizontally disposed linear actuator 16 is mounted to a guide rail 18 and may be controlled for travel along the rail 18. Linear movement of the actuator 16 controls the lateral position of the gripping device 10 across the width of the conveyor 14. Similarly, vertically disposed linear actuator 19 controls the vertical positioning of the gripping device 10. The vertical actuator 19 is also illustrated as having a rotary component, whereby the gripping device 10 may be rotated if necessary to align with an underlying object 12.

The system illustrated in FIG. 1 may be used, for example, to transport objects 12 and 12' from the conveyor 14 to another conveyor (not shown), to a packaging station (not shown), or a storage bin (not shown), as well as a number of other destinations. Furthermore, it will be appreciated that the gripping device 10 constructed in accordance with the present invention can be used in many other applications as well, and the illustration of FIG. 1 should not be viewed as an environmental limitation upon the appended claims. As will be discussed in greater detail below, the gripping device 10 is preferably pneumatically operated and is adapted for gripping the outer surface of objects such as object 12, or alternatively, for gripping the inner surface of objects, such as object 12'.

Figure 2:
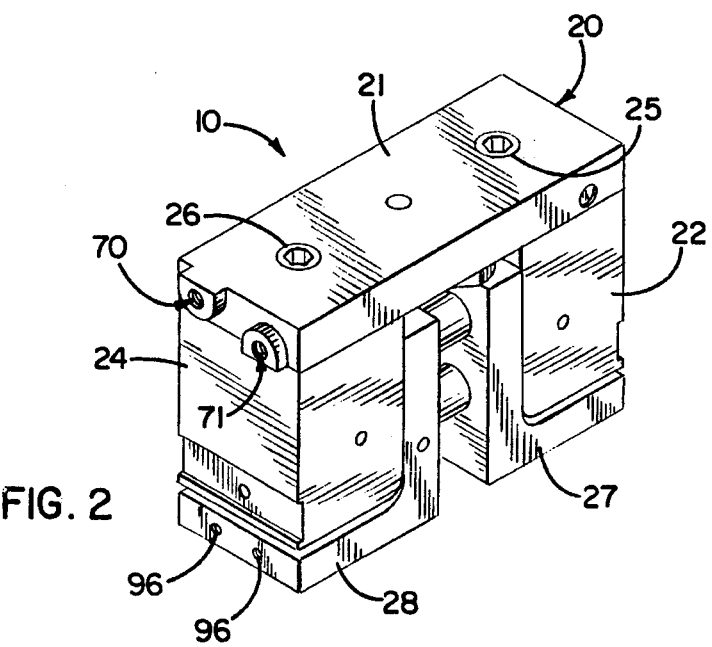
FIG. 2 is an enlarged perspective view of a gripping device in accordance with the present invention.
Figure 5:
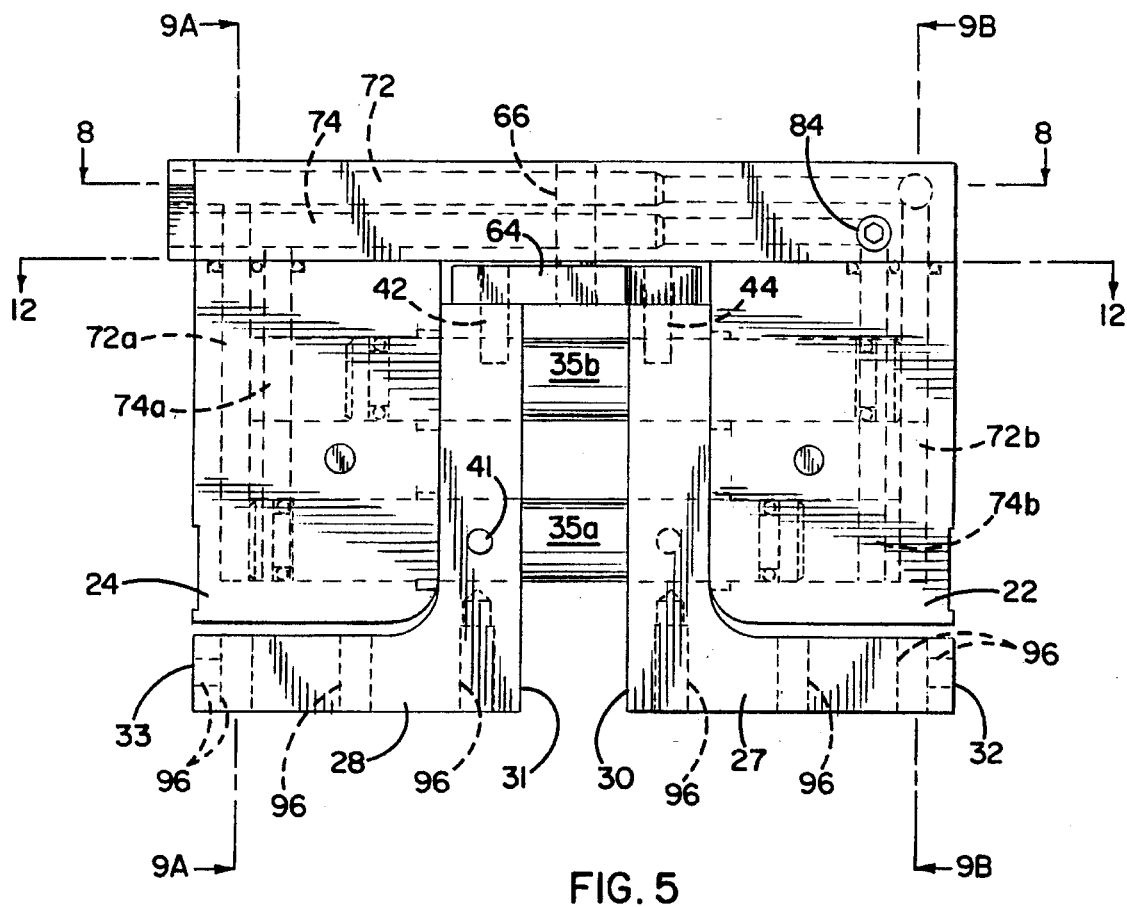
FIG. 5 is an elevated side view of the gripping device shown in FIG. 2, illustrating internal fluid passages in phantom line.
Figure 6:
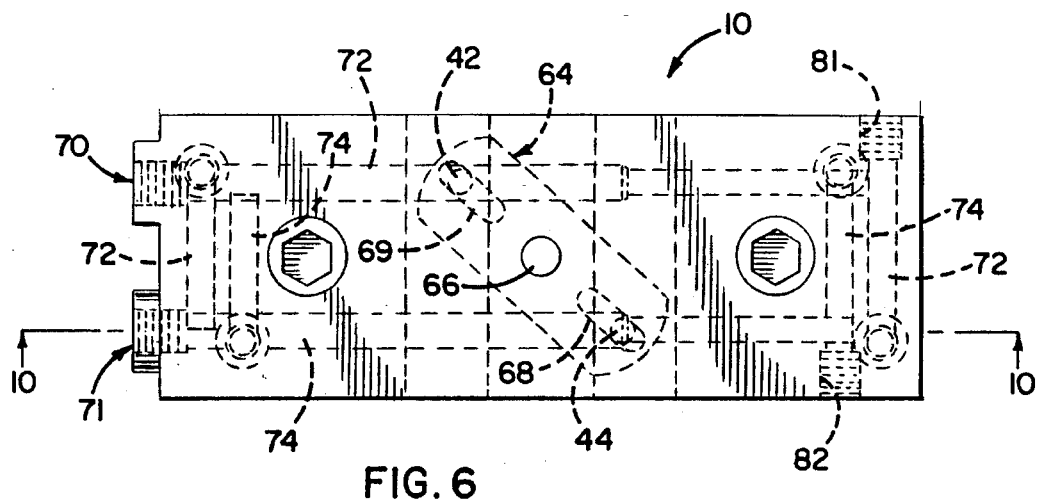
FIG. 6 is a top plan view of the gripping device shown in FIG. 2, illustrating internal fluid passages in phantom line.
Figure 7:
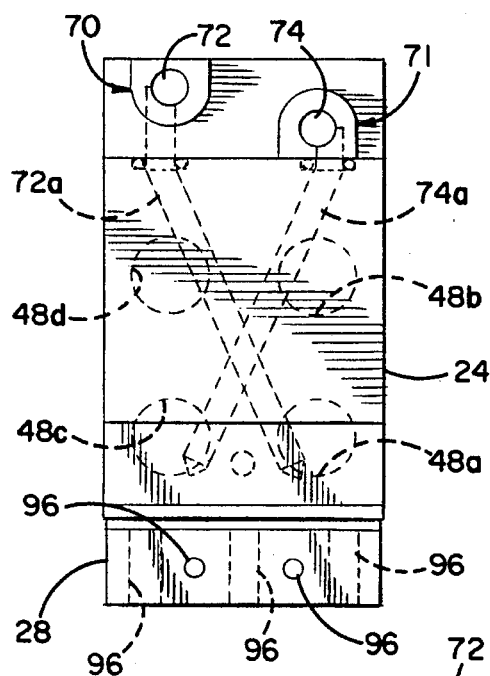
FIG. 7 is an end view of the gripping device shown in FIG. 2, illustrating internal fluid passages in phantom line.
Figure 10:
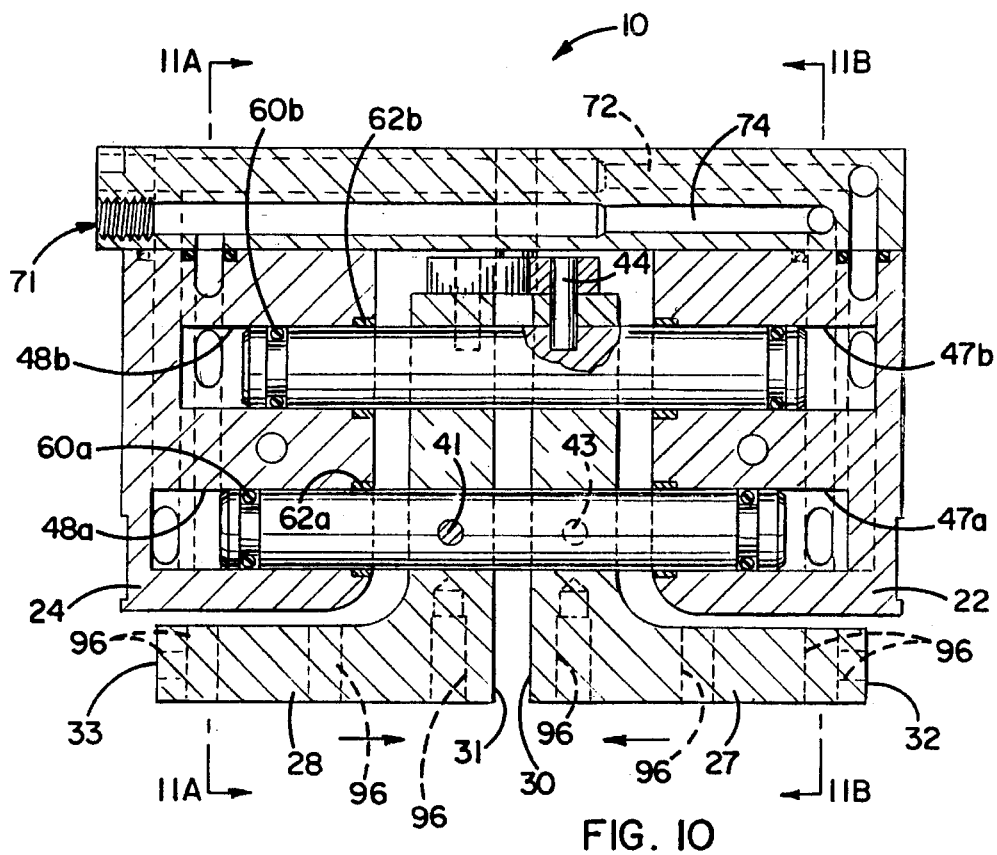
FIG. 10 is a cross-sectional side view of the gripping device shown in FIG. 2, as taken substantially along line 10—10 of FIG. 6.

In keeping with the description of the present invention, reference is made to FIGS. 2, 3, 4 and 10 which illustrate the principal structure of the preferred gripping device 10. In this regard, FIG. 2 is a perspective view showing the gripping device 10 in its assembled condition. FIGS. 3 and 4 are exploded perspective views which together illustrate the component parts required for assembling the preferred gripping device 10. Finally, FIG. 10 is a cross-sectional side view illustrating aspects of the present invention not readily discernible from an exterior perspective view.

The gripping device 10 includes a body 20 which is comprised of a top 21 and two opposing sides 22 and 24. The sides 22 and 24 are fixed to the top 21 preferably by screws 25 and 26. Gripping jaws 27 and 28 are disposed between the sides 22 and 24 for opposing reciprocal motion. The gripping jaws 27 and 28 are preferably L-shaped to provide both interior and exterior gripping surfaces. More specifically, it is contemplated that end-tooling will be used in connection with the preferred gripping device. In this regard, threaded holes 96 are provided in the bottoms and ends of the gripping jaws 27 and 28. End-tooling is attached to the gripping jaws 27 and 28, as by screws. The end-tooling, in turn, is shaped to conform to the particular object that is to be gripped by the device 10. In this way, the present invention may be readily adapted to grip objects having a wide variety of shapes, merely by replacing the end-tooling. Advantageously, this protects the surfaces of the gripping jaws 27 and 28 from unnecessary wear. Since the end-tooling does not form part of the present invention, it has not been illustrated in the drawings, but those skilled in the art will appreciate its use.

Alternatively, interior gripping surfaces, or compression surfaces, 30 and 31 may be provided to directly (i.e., without end-tooling) grip outside surfaces of an object as the jaws 27 and 28 squeeze together (FIG. 10). Similarly, outside gripping surfaces, or expansion surfaces 32 and 33, may be provided to directly grip interior surfaces of an object as the jaws 27 and 28 of the gripping device 10 expand. As will be described in greater detail below, a significant aspect of the illustrated gripping device 10 is that equal compression and expansion forces are achieved by virtue of the mechanism provided for driving the gripping jaws 27 and 28. Accordingly, objects of equal weight may be carried by the gripping device 10 whether gripped by exterior or interior surfaces.

The gripping jaws 27 and 28 are carried on pistons 35a–35d utilized to both drive the gripping jaws 27 and 28, as well as guide the gripping jaws 27 and 28. In this regard, the pistons 35a–35d extend through bores 36a–36d and 37a–37d, respectively, provided in the jaws 27 and 28. More specifically, pistons 35a and 35d are carried in bores 37a and 37d of gripping jaw 28. Fastening pins 41 and 42 extend through jaw 28 to penetrate pistons 35a and 35d at an intermediate position along the length of the pistons to form a fixed attachment therewith. Likewise, fastening pins 43 and 44 are inserted through gripping jaw 27 to radially project into bores 36b and 36c and thus into pistons 35b and 35c. In this way, gripping jaw 27 is carried along with pistons 35b and 35c for reciprocal movement therewith. Similarly, gripping jaw 28 is carried on pistons 35a and 35d for reciprocal movement therewith. As will become appreciated from the discussion below, pistons 35b and 35c are reciprocated in unison. Furthermore, pistons 35a and 35d are reciprocated in unison; the reciprocation of pistons 35a and 35d being approximately 180° out of phase with the reciprocation of pistons 35b and 35c. In this way, the jaws 27 and 28 cooperate to open and close in a synchronized fashion.

Figure 11A:
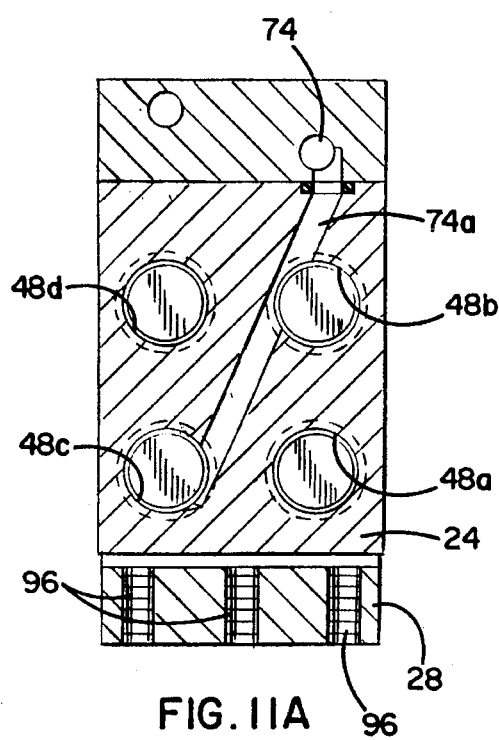
FIG. 11A is a cross-sectional end view of the gripping device shown in FIG. 2, as taken substantially along line 11A—11A of FIG. 10.
Figure 11B:
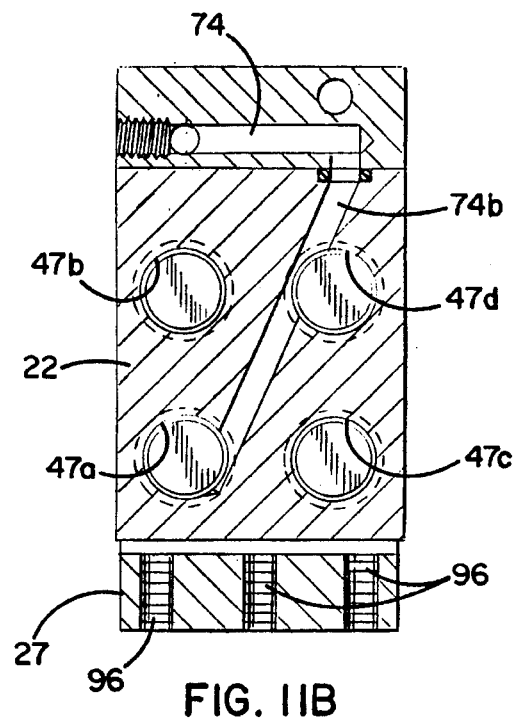
FIG. 11B is a cross-sectional end view of the gripping device shown in FIG. 2, as taken substantially along line 11B—11B of FIG. 10.

To more particularly describe the reciprocation of pistons 35a–35d, cylinders 47a–47d and 48a–48d (see FIGS. 11A and 11B) are provided in opposing sides 22 and 24, respectively, to receive the opposing ends of pistons 35a–35d. As shown in FIG. 10, the cylinders 47a–47d and 48a–48d each define a space axially off the ends of the pistons 35a–35d. In a manner that will be described in greater detail below, the present invention operates to apply fluid pressure (preferably pneumatic) to the spaces defined by cylinders 47a–47d and 48a–48d so as to reciprocate the pistons 35a–35d. To this end, piston 35a is driven to the right (so as to close gripping jaw 28—see FIG. 10) by applying a high fluid pressure to cylinder 48a and a relatively low fluid pressure to space 47a. Thus, a relative differential in pressure between the spaces defined by the corresponding cylinders off the ends of a given piston will serve to apply a net axial force along that piston in the direction of the relatively low pressure space.

Figure 9A:
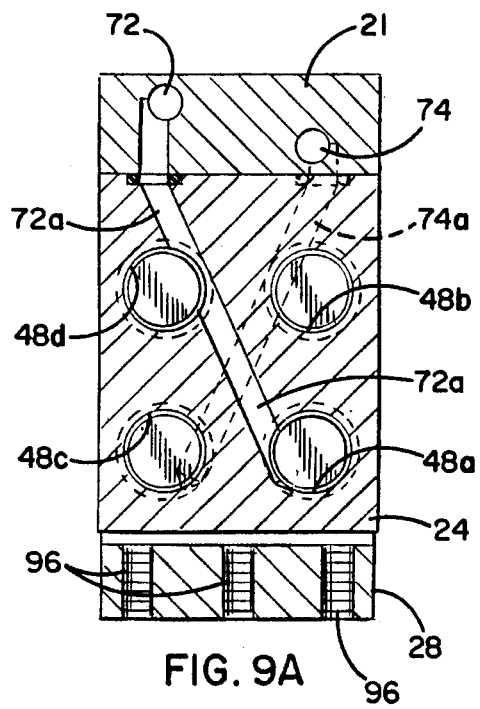
FIG. 9A is a cross-sectional end view of the gripping device shown in FIG. 2, as taken substantially along line 9A—9A of FIG. 5.
Figure 9B:
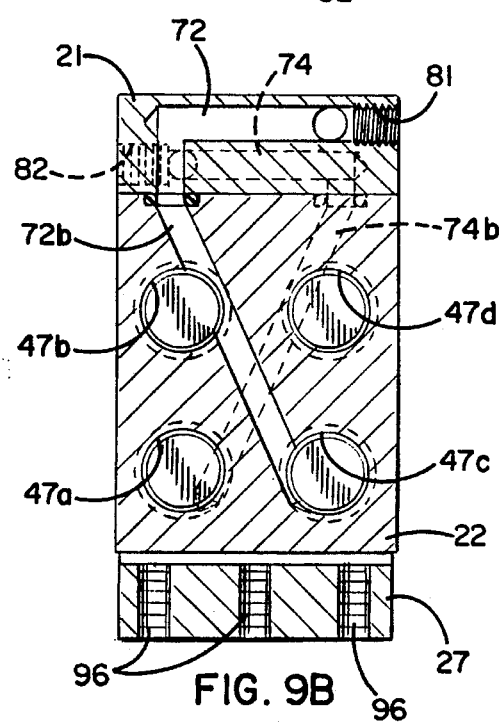
FIG. 9B is a cross-sectional end view of the gripping device shown in FIG. 2, as taken substantially along line 9B—9B of FIG. 5.

As shown in the illustrated embodiment, it is preferred to utilize four pistons 35a–35d. Since pistons 35a and 35d are fixed to gripping jaw 28, movement of gripping jaw 28 between open and closed positions is achieved by uniformly reciprocating the pistons 35a and 35d. To facilitate this operation, spaces 47a and 47d are interconnected in fluid communication by passage 72b (see FIG. 9B). Likewise, the space defined by cylinders 47b and 47c are in fluid communication through passage 74b (see FIG. 11B). Furthermore, passages 72a and 74d (FIGS. 9A and 11A) interconnect cylinders 48b and 48c and cylinders 48a and 48d, respectively. In accordance with the preferred embodiment, and as will be discussed in greater detail below, synchronization of the fluid pressurization of the various cylinders is coordinated so that, as pistons 35a and 35d are controlled to travel in one direction, pistons 35b and 35c are controlled to travel in the opposing direction. Reversing the pressurization applied to the various cylinders will result in movement of the pistons 35a–35d in the opposite direction. Therefore, controlled alternation of the cylinder pressurizations will serve to reciprocate the pistons and, therefore, reciprocate the gripping jaws 27 and 28 between open and closed positions.

It will be appreciated by one of ordinary skill practicing the invention, that the pressure differential necessarily applied to the spaces off the ends of the pistons will be determined by a number of collective factors, including the number and diameter of the pistons (i.e., area of pressurization), the texture and surface area of the gripping jaws (or end-toolings), and the shape and weight of the device to be gripped and lifted. It will be further appreciated that a significant advantage of the present invention is the utilization of the entire surface area of the piston cross section when driving the pistons in either direction. That is, each piston is driven in a first direction by applying a relatively high pressure to the space off one end of the piston, and that same piston is driven in the opposite direction by applying a relatively high pressure to the space off the opposite end of the same piston. Moreover, since the pistons are driven in concert and have equal cross-sectional area at the ends, the gripping force realized by the inner gripping surfaces 30 and 31 (or gripping surfaces of end-tooling) by the compression of jaws 27 and 28 is equal to the gripping force realized at outer surfaces 32 and 33 (or outer surfaces of end-tooling) of the gripping jaws (assuming equal fluid pressure differential). Advantageously, objects of similar weight may be grasped by either the inner gripping surfaces 30 and 31 or the outer gripping surfaces 32 and 33, depending on the particular shape of the object.

Another significant feature of the present invention is the utilization of the drive pistons 35a–35d to provide the driving force for gripping jaws 27 and 28, as well as guide gripping jaws 27 and 28, by extending through the bores 36a–36d and 37a–37d. It will be further appreciated that, in this particular configuration, the driving forces applied to gripping jaws 27 and 28 are very near the area of the gripping jaws that contact and grasp the object. Therefore, the bending moment about the object is minimized.

As is appreciated from FIG. 10, both ends of the pistons 35a–35d remain within the cylinders 47a–47d and 48a–48d at all times. To minimize leakage about the pistons and therefore maximize the fluid pressure differential between the spaces off the ends of the pistons, O-rings 60a–60d are provided at the ends of pistons 35a–35d. Furthermore, and to facilitate reciprocation of pistons 35a–35d, linear bearings or sleeve bearings 62a–62d are provided to reduce frictional engagement between the pistons 35a–35d and the cylinders.

In accordance with the preferred embodiment of the present invention, the gripping jaws 27 and 28 operate to open and close in unison. While this is facilitated by the controlled pressurization of the spaces defined by cylinders 47a–47d and 48a–48d, it will be appreciated that frictional variations of the pistons 35a–35d within the respective cylinders may alter the otherwise synchronized operation of the gripping jaws 27 and 28. Accordingly, means are provided for ensuring synchronized operation of the gripping jaws 27 and 28. While there are a variety of known mechanisms for achieving such synchronization, in the illustrated embodiment this means includes a rocker arm 64 (see FIG. 4). Broadly, the rocker arm 64 pivots about a center point and includes elongated guide slots for controlled movement of the gripping jaws 27 and 28.

Figure 12:
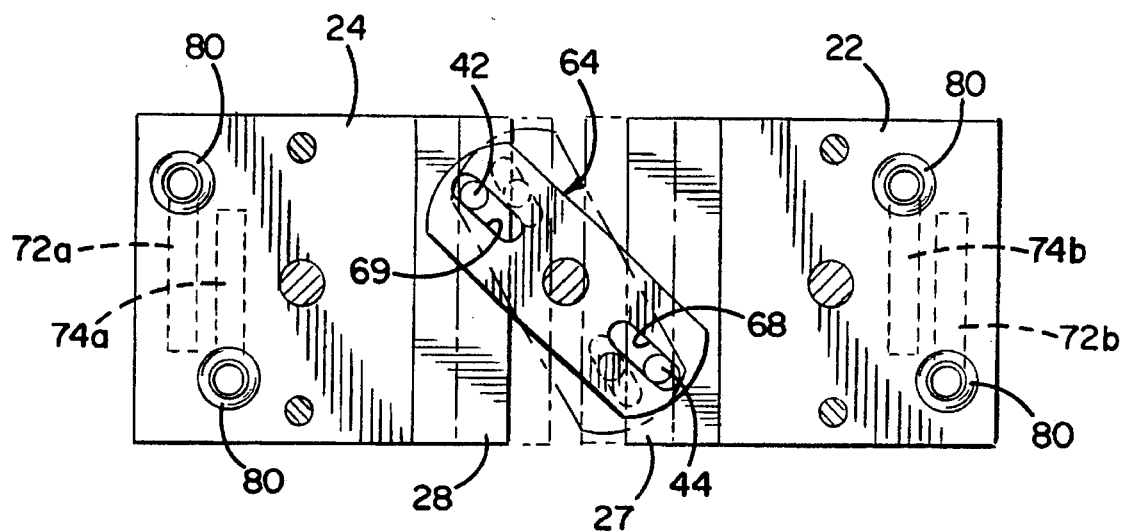
FIG. 12 is a cross-sectional top view of the gripping device shown in FIG. 2, as taken substantially along line 12—12 of FIG. 5.

More specifically, a center pivot pin 66 extends through the top 21 and into a pivot hole 67 of rocker arm 64. Elongated guide slots 68 and 69 are linearly disposed with respect to one another and on either side of center pivot hole 67. Diagonally offset retaining pins 42 and 44 project upwardly from gripping jaws 28 and 27, respectively, and are received by slots 69 and 68, respectively (see FIGS. 4, 10 and 12). As the gripping jaws 27 and 28 are motivated toward the closed position, pins 42 and 44 will slide toward the centermost location of slots 69 and 68 thereby pivoting rocker arm 64 about the pivot access defined by hole 67. Similarly, as gripping jaws 27 and 28 move toward the open position, pins 42 and 44 will slide outwardly in slots 69 and 68 and pivot the rocker arm 64 accordingly. It will be appreciated that movement of a single gripping jaw, jaw 27 for example, will cause pin 44 to travel within slot 68 and thereby force a pivotal movement to rocker arm 64. This pivotal motion in turn applies a force to guide pin 42 forcing the gripping jaw 28 to move in synchronization with gripping jaw 27. More specifically, the pivotal motion of rocker arm 64, and related structure, effectively translates movement of either of the gripping jaws to the opposing gripping jaw so that they move in synchronization. While this configuration could result in heavy stresses applied at pins 42 and 44, it is anticipated that under normal and controlled operation, the various cylinders 47a–47d and 48a–48d will be pressurized in such a manner as to operate gripping jaws 27 and 28 in concert, and therefore the stresses on pins 42 and 44 will be minimal.

In accordance with another aspect of the present invention, and as previously mentioned, the opposing cylinders, for example cylinder 47a and 48a, will be pressurized in opposing fashion so as to move piston 35a in the direction of the cylinder having the lower relative pressure. In accordance with the fluid passage network of the preferred embodiment, cylinders 47a, 47d, 48b, and 48c are in fluid communication and thus realize a uniform fluid pressure. In a similar fashion, cylinders 47b, 47c, 48a, and 48d are in fluid communication and thus realize uniform fluid pressure.

Reference will now be made to FIGS. 5–12 in describing the network of fluid passages in the illustrated embodiment. In short, the internal fluid passages define two distinct regions of fluid pressurization within the gripping device 10, and these regions are interconnected among the various cylinders as previously listed. The top 21 of gripping device 10 includes a first port 70 and a second port 71 which are in communication with the first and second fluid pressurization regions. Although not illustrated in the drawings, these ports are interconnected by way of pneumatic cabling to an external fluid pressurization source, which controllably supplies fluid pressure to the internal fluid pressurization regions by way of first and second ports 70 and 71. As illustrated in the drawings, the fluid pressurization regions are more particularly described by fluid channels which are offset either vertically or horizontally so as not to intersect.

Rather than provide an exhaustive description of the particular path defined by the passages, the first fluid passage is generally designated by reference numeral 72 and the second fluid passage is generally designated by reference numeral 74. Offshoots of these passages are designated by an alphabetic suffix (e.g., a or b) to the reference numeral. For example, the first communication of passage 72 interconnects cylinders 48a and 48d by an ancillary passage 72a depending diagonally from the main passage 72 extending through the top 21 of gripping device 10 (see FIG. 9A). In similar fashion, ancillary passage 74a interconnects cylinders 48b and 48c by depending from the main passage 74 in the top 21 diagonally through side 24. The passages 72a and 72b and 74a and 74b extend from passages 72 and 74 respectively in the top 21 to each side 22 and 24. O-rings 80 are provided to seal these passages at the junction between top 21 and sides 22 and 24.

Figure 8:
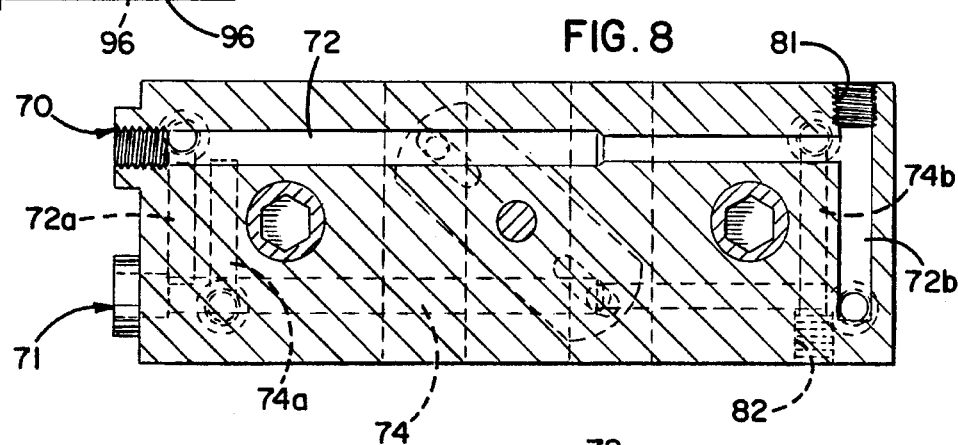
FIG. 8 is a cross-sectional top view of the gripping device shown in FIG. 2, as taken substantially along line 8—8 of FIG. 5.

As best shown in FIG. 8, additional ports 81 and 82 are provided, and are in fluid communication with passages 72 and 74, respectively. Each of the ports 70, 71, 81 and 82 is threaded to receive a plug, such as 83 and 84 (FIG. 4). The duplicative ports are preferred so that the device 10 may be connected to an external fluid pressurization source either by end ports 70, 71 or side ports 81, 82, depending upon the environment. Plugs 83 and 84 seal those ports that are not used.

The foregoing description of various preferred embodiments of the invention has been presented for purposes of illustration and description. It is not intended to be exhaustive or to limit the invention to the precise forms disclosed. Indeed, obvious modifications or variations are possible in light of the above teachings. For example, it will be appreciated that the invention, although illustrated to have four pistons 35a–35d, would operate from two pistons as well. Of course, this modification would necessarily result in a modification of the structural fluid passages defined within the top 21 and sides 22 and 24 of the body 20. It is nevertheless understood that one of these two pistons would be fixed to one of the gripping jaws, while the second piston would be fixed to the opposing gripping jaw. The fluid pressurization within the cylinders at the ends of the pistons would be controlled in a manner as described in connection with the four piston embodiment, so as to reciprocate each piston substantially 180° out of phase with respect to the other piston.

Figure 13:
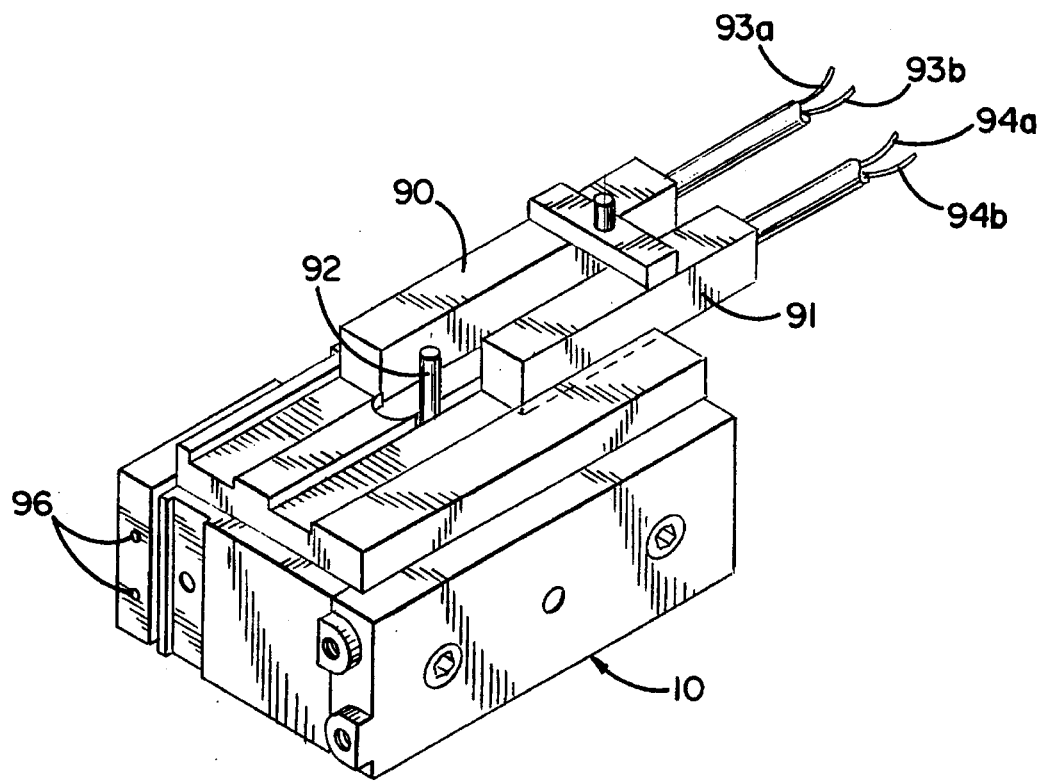
FIG. 13 is a perspective view of a gripping device as shown in FIG. 2, further including proximity switches for controlled movement of the gripping jaws.

A further embodiment would be similar to that shown in FIG. 13. There, the gripping device 10 is preferably the same as that described in connection with the previously described figures. The device, however, additionally includes limit switches 90 and 91. These switches, which are also known as proximity switches, detect the presence of a metal pin 92. Preferably, this pin 92 is fixed to one of the jaws of the gripping device 10. When the pin 92 aligns with a specific location of switch 90, an appropriate signal is sent out over conductive lines 93a and 93b. Similarly, when pin 92 aligns with a certain location of switch 91, an appropriate electrical signal is sent out over conductive lines 94a and 94b. Although not shown, it is contemplated that these conductive lines are connected to a controller which, in turn, controls the operation of an external fluid pressurization source. Neither the controller nor the fluid pressurization are illustrated in the drawings, since they do not form part of the present invention.

It will be appreciated that the use of limit switches, as illustrated in FIG. 13, is useful when precise position control of the gripping jaws 27 and 28 is desired. For example, if it is desired to prevent the jaws from completely closing, limit switch 90 may be positioned to send a signal over wires 93a and 93b to a controller which will inhibit the operation of the fluid pressurization source to stop the closure of gripping jaws 27 and 28. Likewise, if it is desired to inhibit the jaws 27 and 28 from completely opening, limit switch 91 may be appropriately opened to sense the open position of jaws 27 and 28 and control their maximum open position.

In yet a further embodiment, the rocker arm 64 may be removed to permit independent movement of the gripping jaws. In accordance with this embodiment, it may be preferred to maintain the internal passage structure as illustrated in the drawings, whereby reciprocation of the gripping jaws is not totally independent, but rather a function of the fluid pressurization at ports 70 and 71. It may be desired, however, in alternative embodiments to provide additional fluid passages, and thus additional externally accessible ports, so as to provide completely independent operation of the gripping jaws 27 and 28.

In connection with the embodiments briefly referenced above, wherein independent, or at least quasi-independent operation of the gripping jaws is provided by removal of rocker arm 64, it is often desired to include a mechanical stop to limit the extent of the travel of one or both of the gripping jaws 27 and 28. That is, a mechanical stop may be attached to the gripping device 10 to limit the extension of one or both of the jaws, or alternatively to limit the extent of the compression of one or both of the jaws. It has been found that these various embodiments, in one form or another which permit independent movement of the gripping jaws, are desirable when gripping and lifting irregularly shaped, or imprecisely placed objects. In this manner, the jaws may begin to open or close, and upon one jaw striking the object, that jaw would cease to advance while the fluid pressurization would continue to advance the opposing jaw until both jaws properly contact and grip the object. Furthermore, limit switches as described in connection with FIG. 13 may be utilized to limit the movement of the gripping jaws, when the device 10 is configured to move the jaws independently by removing rocker arm 64.

Figure 14:
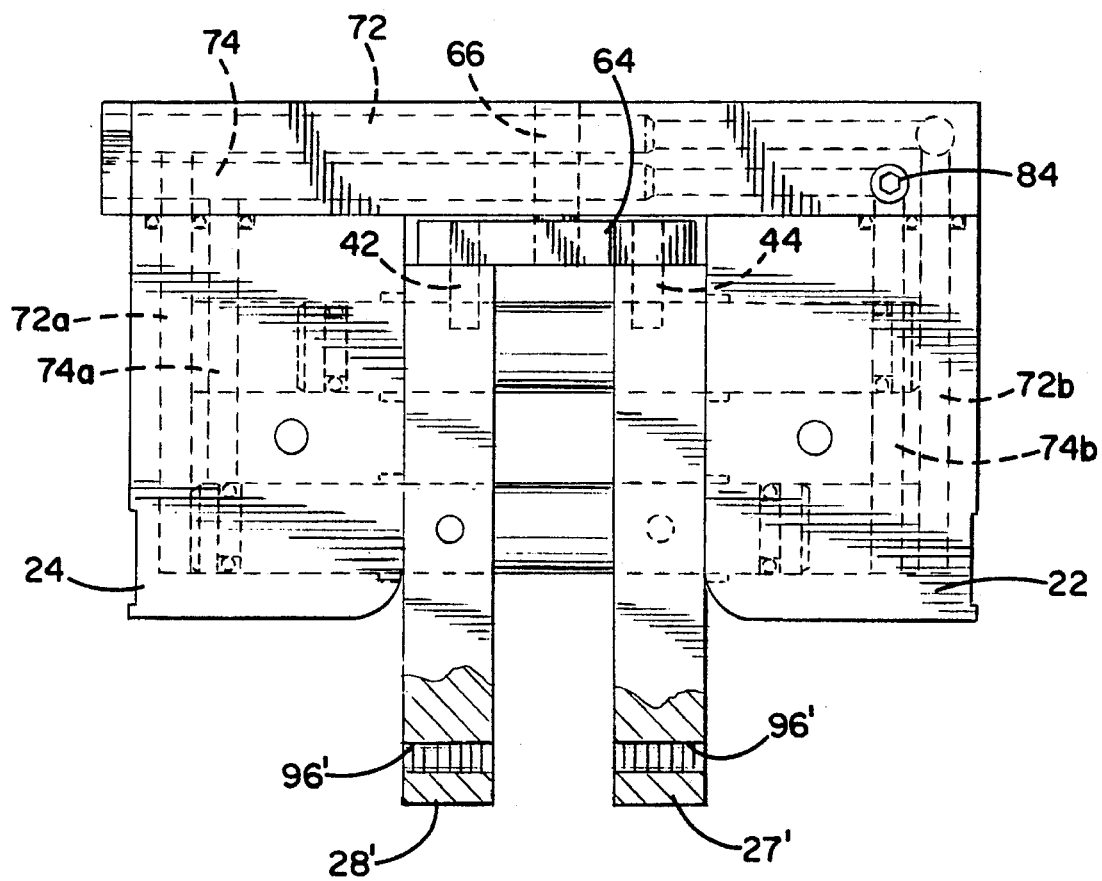
FIG. 14 is a side view of a gripping device similar to that illustrated in FIG. 2, and having an alternative jaw configuration.

Yet a further embodiment is shown in FIG. 14. This embodiment is similar to the preferred embodiment in all respects, except that gripping jaws 27' and 28' are straight, rather than L-shaped. In this embodiment, threaded holes 96' extend entirely through the gripping jaws 27' and 28' so that end-tooling (not shown) may be attached to either the inside or outside of the gripping jaws 27' and 28'.

The embodiments discussed herein were chosen and described to provide the best illustration of the principals of the invention and its practical application to thereby enable one of ordinary skill in the art to utilize the invention and various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A gripping device comprising:

a body having opposing sides, each side having at least two inwardly directed cylinders aligned with the cylinders of the opposing side;

first and second pistons extending between the aligned cylinders, the cylinders defining a space axially off the ends of the pistons;

means for providing a high fluid pressure to the space off one end of each piston and a relatively low fluid pressure to the space off the other end of each piston, to urge each piston axially in the direction of the space having lower fluid pressure, the means further configured to pressurize the spaces to urge the first and second pistons in opposing relation;

first and second gripping jaws, the first gripping jaw being carried on the first piston and the second gripping jaw being carried on the second piston, whereby axial movement of the first and second pistons in opposing directions moves the first and second gripping jaws in opposing directions to clamp and release objects.

2. A gripping device according to claim 1, wherein the gripping jaws include inwardly disposed gripping surfaces.

3. A gripping device according to claim 2, wherein the gripping jaws include outwardly disposed gripping surfaces.

4. A gripping device according to claim 1, wherein the gripping jaws include outwardly disposed gripping surfaces.

5. A gripping device according to claim 1, wherein the means for providing high fluid pressure to the space off the first end of each piston includes first and second fluid passages within the body, the first and second fluid passages being in fluid communication with first and second ports disposed for connection to an external fluid pressure source.

6. The gripping device according to claim 1, wherein the first and second gripping jaws include first and second receiving bores that are axially aligned with the cylinders in the opposing sides of the body, the first and second pistons extending through the bores.

7. The gripping device according to claim 6, wherein the first piston is fixedly attached to the first gripping jaw at a bore and slidably received by a bore in the second gripping jaw, and the second piston is fixedly attached to the second gripping jaw at a bore and slidably received by a bore in the first gripping jaw.

8. The gripping device according to claim 1, further including third and fourth pistons extending between aligned cylinders disposed in the opposing sides, the first gripping jaw being carried on the first and third pistons and the second gripping jaw being carried on the second and fourth pistons.

9. The gripping device according to claim 8, wherein the cylinders define a space axially off the ends of the third and fourth pistons, the space off the ends of the first and third pistons being in fluid communication, and the space off the ends of the second and fourth pistons being in fluid communication.

10. A gripping device comprising:

first and second pistons;

a body with first and second sides disposed in opposing relation, each side having first and second cylinders to receive the first and second pistons and aligned with the cylinders in the opposing side, the cylinders defining a space located axially off each end of the pistons, the body further having first and second ports for connection to an external fluid pressure source;

first and second fluid passages within the body, the first fluid passage in fluid communication with the first port and the cylinders corresponding with the first piston in the first side and the second piston in the second side, the second fluid passage in fluid communication with the second port and the cylinders corresponding with the first piston in the second side and the second piston in the first side; and first and second gripping jaws, the first gripping jaw being carried on the first piston and the second gripping jaw being carried on the second piston for movement between open and closed position;

whereby applying a high pressure fluid to the first port and a relatively low pressure fluid to the second port will cause the first and second pistons and therefore the first and second gripping jaws to move in opposing relation, and alternating the fluid pressure applied to the first and second ports will cause the gripping jaws to move reciprocally in opposing relation.

11. The gripping device according to claim 10, further including third and fourth pistons and third and fourth cylinders disposed within the sides of the body to receive the third and fourth pistons.

12. The gripping device according to claim 11, wherein the first gripping jaw is carried on the first and third pistons and the second gripping jaw is carried on the second and fourth pistons.

13. The gripping device according to claim 12, wherein the first and third cylinders of each side are in fluid communication and the second and fourth cylinders of each side are in fluid communication, whereby applying high pressure fluid to the first fluid passage and a relatively low pressure fluid to the second fluid passage will cause the first and third pistons to move the first gripping jaw in one direction and the second and fourth pistons to move the second gripping jaw in the opposing direction.

14. The gripping device according claim 10, further including means for ensuring symmetric movement of the first and second gripping jaws in opposing relation.

* * * * *

UNITED STATES PATENT AND TRADEMARK OFFICE
CERTIFICATE OF CORRECTION

PATENT NO. : 5,620,223
DATED : 04/15/97
INVENTOR(S) : Douglas W. Mills

It is certified that error appears in the above-identified patent and that said Letters Patent is hereby corrected as shown below:

On the cover page, please change the "Assignee" by deleting "Gabco" and inserting --Fabco-- therefor.

Signed and Sealed this

Fourteenth Day of October, 1997

Attest:

BRUCE LEHMAN

Attesting Officer

Commissioner of Patents and Trademarks